United States Patent [19]

Logwin

[11] 4,077,822

[45] Mar. 7, 1978

[54] SPLICE FOR USE DURING THE THERMAL STABILIZATION OF A FLAT MULTIFILAMENT BAND OF AN ACRYLIC FIBROUS MATERIAL COMPRISING AT LEAST TWO SEGMENTS

[75] Inventor: John R. Logwin, Somerset, N.J.

[73] Assignee: Celanese Corporation, New York, N.Y.

[21] Appl. No.: 742,384

[22] Filed: Nov. 17, 1976

[51] Int. Cl.² .............................................. B31F 5/00
[52] U.S. Cl. .................................... 156/157; 8/115.5; 156/158; 156/289; 156/329; 156/163; 156/502; 260/46.5 G; 264/258; 428/57; 428/447
[58] Field of Search ............... 156/329, 312, 157, 158, 156/163, 166, 289, 295, 296, 502, 304; 428/57, 447, 451, 58; 264/83, 234, 258, 345; 8/115.5; 260/46.5 G

[56] References Cited

U.S. PATENT DOCUMENTS

| | | | |
|---|---|---|---|
| 2,799,915 | 7/1957 | Barnett et al. | 8/115.5 |
| 3,125,477 | 3/1964 | Laliberte | 156/158 |
| 3,134,703 | 5/1964 | Listner | 156/157 |
| 3,240,731 | 3/1966 | Nitzsche et al. | 260/46.5 G |
| 3,355,480 | 11/1967 | Di Paola | 260/46.5 G |
| 3,539,295 | 11/1970 | Ram | 8/115.5 |
| 3,619,314 | 11/1971 | Ecureux | 156/157 |
| 3,671,192 | 6/1972 | Ezekiel | 8/115.5 |
| 3,701,753 | 10/1972 | Shaw | 428/447 |
| 3,705,120 | 12/1972 | Kawaguchi | 260/46.5 G |

Primary Examiner—William A. Powell
Assistant Examiner—J. J. Gallagher

[57] ABSTRACT

An improved flexible splice is provided which is useful in joining segments of a substantially flat band (e.g., a flat tow) of an acrylic fibrous material in an end to end relationship. Such acrylic fibrous material subsequent to splicing, is passed through a heated thermal stabilization zone and thereby undergoes an exothermic cyclization reaction of pendant nitrile groups present therein. More specifically a silicone rubber adhesive is applied to the surfaces of the ends of each band segment and thereafter bonded preferably under elevated temperatures and pressure to form a splice through which the exothermic heat of reaction is effectively dissipated to an extent sufficient to avoid a deleterious effect on the original fibrous configuration which might otherwise result in the absence of such dissipation. The resulting splice is substantially flat in configuration and the band may be continuously passed in the direction of its length through the thermal stabilization zone without impairment of movement resulting from the presence of the splice.

23 Claims, 9 Drawing Figures

U.S. Patent March 7, 1978 Sheet 1 of 2 4,077,822
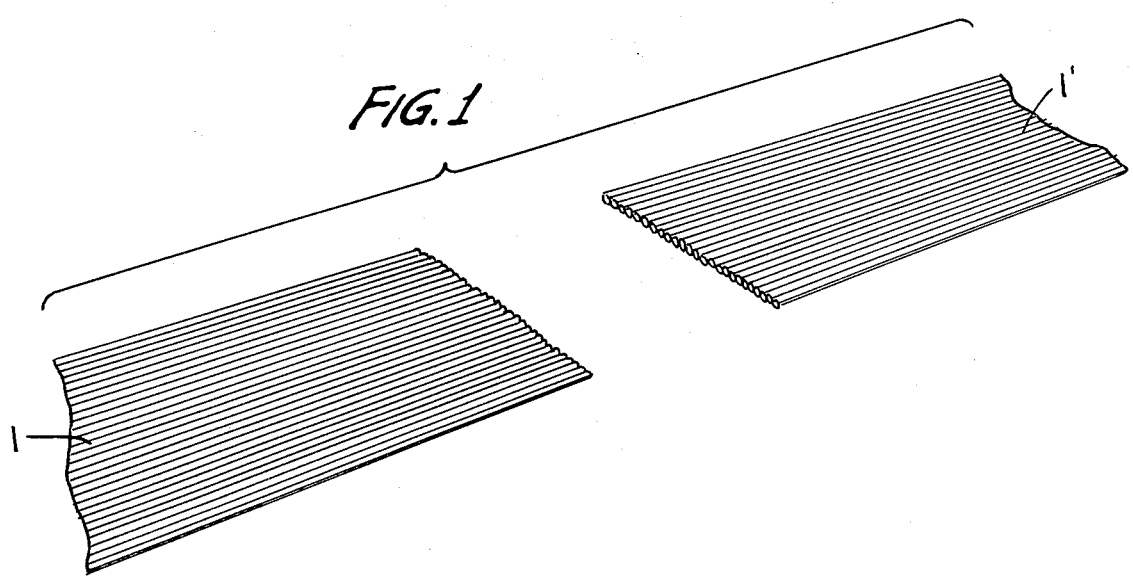
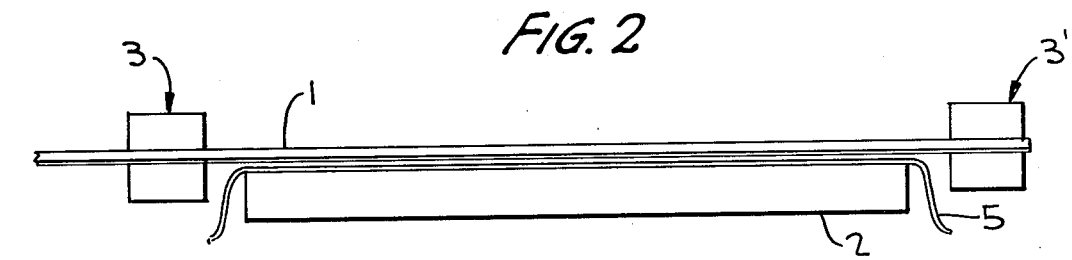
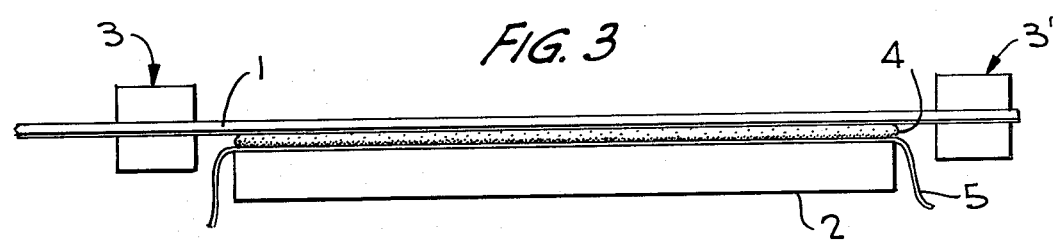
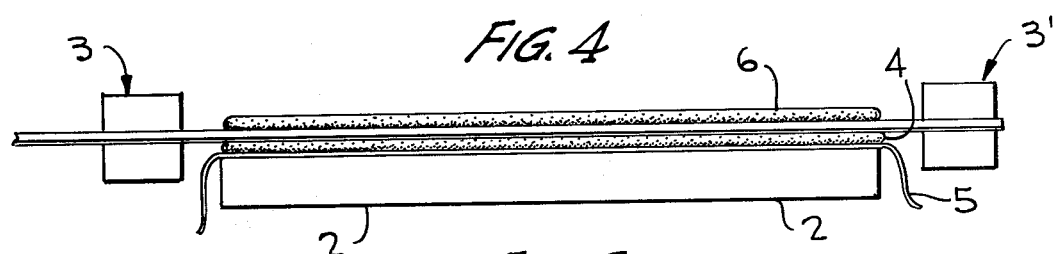
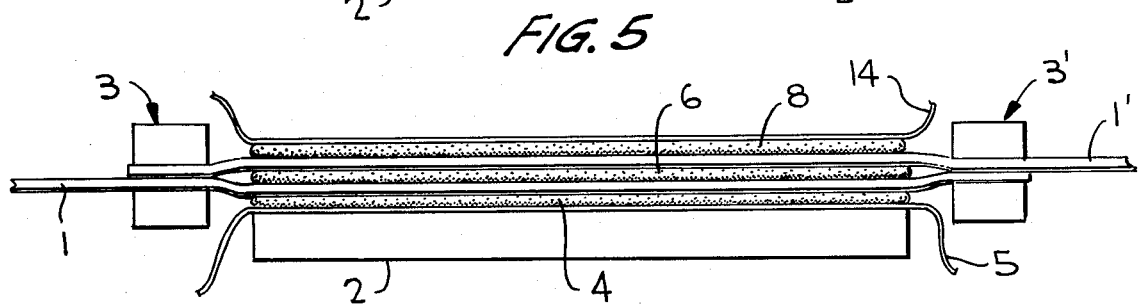

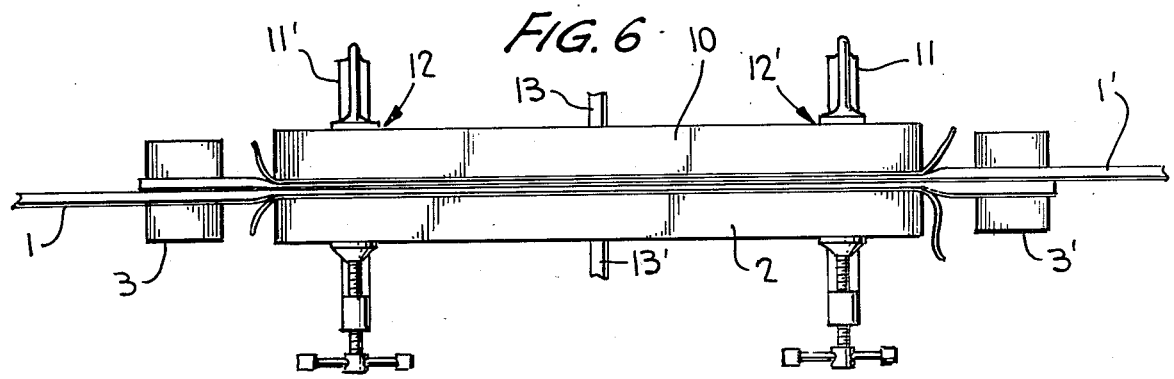
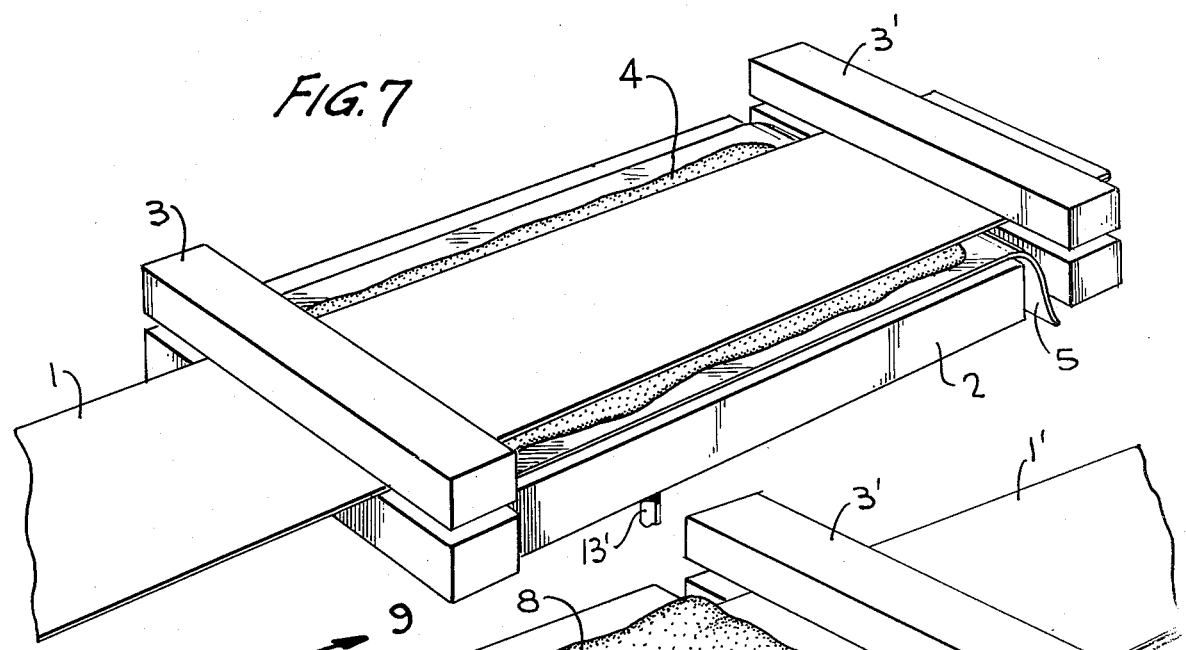
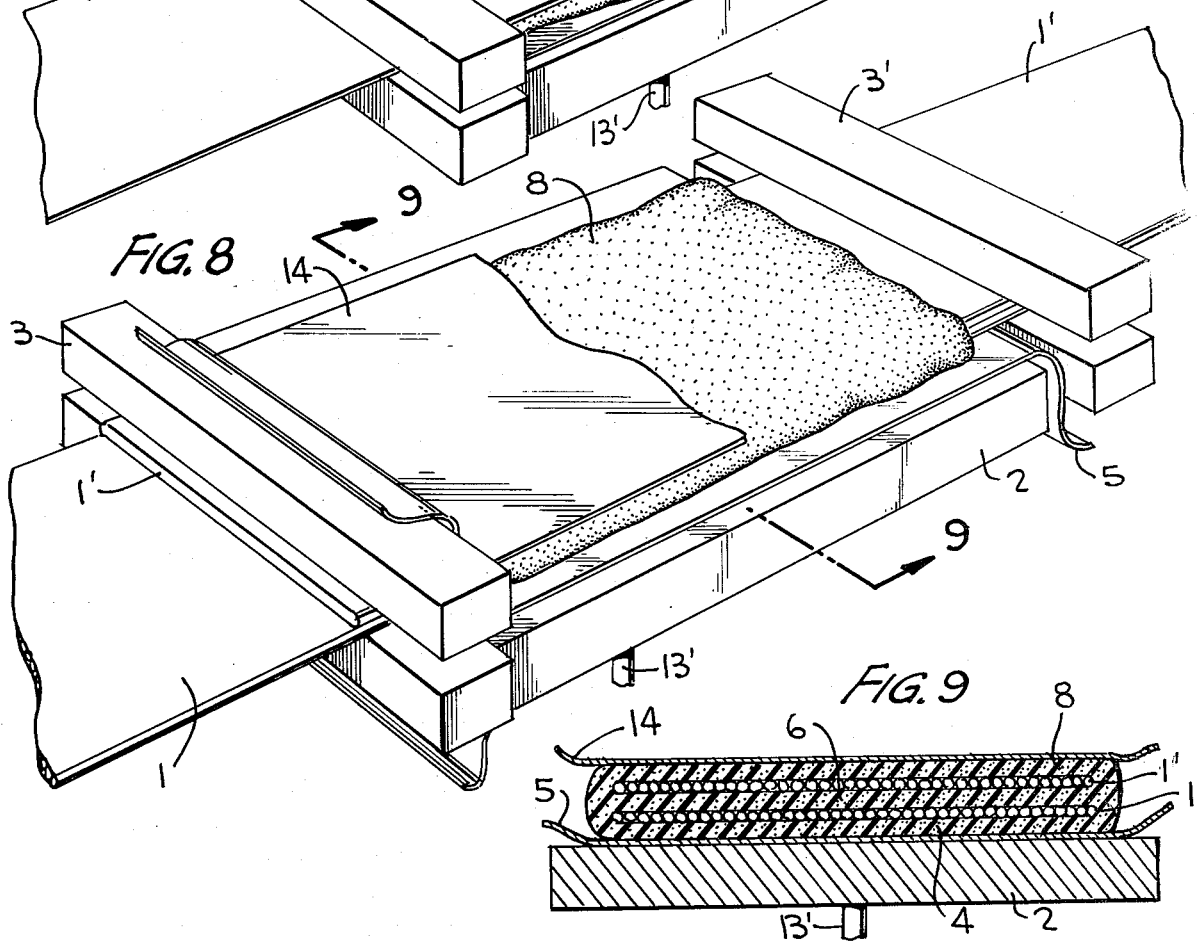
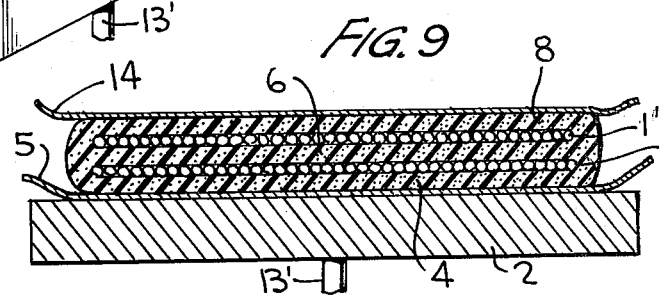

SPLICE FOR USE DURING THE THERMAL STABILIZATION OF A FLAT MULTIFILAMENT BAND OF AN ACRYLIC FIBROUS MATERIAL COMPRISING AT LEAST TWO SEGMENTS

BACKGROUND OF THE INVENTION

It is well known that acrylic fibrous materials when subjected to heat undergo an exothermic thermal stabilization reaction wherein the fibrous material is transformed to a black form which is non-burning when subjected to an ordinary match flame.

Such modification generally has been accomplished by heating the acrylic fibrous material in an oxygen-containing atmosphere. It is believed that the resulting thermal stabilization reaction involves (1) an oxidative cross-linking reaction of adjoining molecules as well as (2) a cyclization reaction of pendant nitrile groups to a condensed dihydropyridine structure. The cyclization reaction is exothermic in nature and must be controlled if the fibrous configuration of the acrylic polymer undergoing stabilization is to be preserved. The resulting thermally stabilized fibrous material is useful as a precursor in the formation of carbon fibers.

On a commercial scale the thermal stabilization reaction commonly is carried out on a continuous basis with a continuous length of a multifilament acrylic fibrous material being passed in the direction of its length through a thermal stabilization zone which is provided with a heated gaseous atmosphere. The movement of the continuous length of acrylic fibrous material through the stabilization zone may be directed by rollers, etc. situated therein.

When the continuous lengths of acrylic fibrous material is in the form of a flat band (e.g., a flat tow), a need has arisen for an improved flat splice which can be used to effectively join the segments of the precursor so that the continuous operation of the thermal stabilization reaction will not have to shut down after the passage of each length of fibrous precursor through the furnace. For instance, acrylic tows are commercially available in the form of a bale having a finite filament length. Considerable down time commonly is involved to cool down the thermal stabilization zone, to string up another length of fibrous precursor, and to again bring the thermal stabilization zone to operating temperature. Such restringing also wastes a portion of the precursor fiber. Accordingly, those skilled in the art have been aware of the need for an effective splice technique whereby the thermal stabilization treatment may be conducted for an extended period of trouble free operation.

It has been found that the exothermic heat of reaction commonly creates difficulties in connection with prior splice attempts since resulting heat is not effectively dissipated and may cause breakage of the fibrous band. Also bulky splices (e.g., knots or splices which attempt to utilize non-flexible adhesives) commonly cannot be accommodated within thermal stabilization zones without interference and loss of process stability. If the band segments are laterally spread prior to conventional splicing in an overlapping fashion in an attempt to deal with the usual exothermic heat of reaction, then the substantially wider section of the band at the splice area complicates processing as the band travels on a continuous basis.

Further, problems arise when attempting to provide a splice due to the high temperatures encountered in the thermal stabilization zone as well as the additional heat generated by the exothermic reaction. One method of overcoming the above described problems is found in U.S. application Ser. No. 641,066, filed Dec. 15, 1975 wherein the end of each band segment is surrounded with and attached to a fabric which is capable of withstanding the heated thermal stabilization. A portion of said fabric extends beyond each enclosed end which extension is sewn together with a similar extension provided on a second band segment. Such a process, however, includes two sewing steps which are time consuming. The search has continued therefore for a way to provide an improved splice for forming the above described band segments which possesses the dual requirements of stability under the elevated temperatures of thermal stabilization, and the ability to dissipate heat to an extent sufficient to avoid the deleterious effects on the original fibrous configuration of the exothermic reaction which might result in the absence of said dissipation.

It is an object of the present invention to provide an improved process for the thermal stabilization of a substantially flat multifilament band of an acrylic fibrous material where the ends of at least two discrete band segments are joined and continuously are passed in a successive manner in the direction of their length through a heated thermal stabilization zone while maintaining the original fibrous configuration of the same substantially intact for a residence time sufficient to render the band black in appearance, and non-burning when subjected to an ordinary match flame.

It is an object of the present invention to provide a substantially flat multifilament band of an acrylic fibrous material which is capable of undergoing thermal stabilization by continuous passage through a thermal stabilization zone in the direction of its length having at least two discrete band segments which are joined in an end relationship by an improved splice.

It is an object of the present invention to provide a flexible splice for joining in an end to end relationship at least two discrete band segments of an acrylic fibrous material wherein the exothermic heat of reaction resulting from a thermal stabilization reaction is readily dissipated through the splice to an extent sufficient to avoid the deleterious effect on the original fibrous configuration which might otherwise result in the absence of such dissipation.

It is a further object of the present invention to provide a flexible splice for joining in an end to end relationship at least two discrete band segments of an acrylic fibrous material which is relatively flat in configuration and readily may be passed through a thermal stabilization zone without impairment of movement resulting from the presence of the splice.

These and other objects as well as the scope, nature, and utilization of the invention will be apparent from the following description and appended claims.

SUMMARY OF THE INVENTION

In one aspect of the present invention there is provided a process for the thermal stabilization of a substantially flat multifilament band of an acrylic fibrous material wherein the ends of at least two discrete band segments each having an upper and lower surface are joined and continuously are passed in a successive manner in the direction of their length through a heated thermal stabilization zone, thereby inducing an exothermic cyclization reaction of pendant nitrile groups present thereon and wherein the original fibrous configuration of the same is maintained substantially intact for a residence time sufficient to render said band black in appearance, and non-burning when subjected to an ordinary match flame; the improvement comprising joining the ends of at least two of said band segments by bonding the substantially flat surfaces of said band segments together with a silicone rubber adhesive in a manner sufficient to provide a flexible splice, through which the exothermic heat of reaction is dissipated to an extent sufficient to avoid a deleterious effect on the original fibrous configuration which might otherwise result in the absence of such dissipation, wherein the ends of said band segments are disposed in an overlapped relationship with each of said band segments extending in an opposite direction and with the silicone rubber adhesive being present on the upper and lower surfaces of said overlapping ends.

DESCRIPTION OF THE DRAWINGS

FIG. 1 is a perspective view of the ends of two discrete substantially flat multifilament band segments of an acrylic fibrous material which must be joined prior to being passed in a successive manner in the direction of their length through a thermal stabilization zone.

FIG. 2 is a side view of a single band segment of FIG. 1 with the end thereof suspended above a support and held by clamps.

FIG. 3 is a side view of the band segment of FIG. 2 wherein a room temperature vulcanizable silicone rubber has been applied to the lower surface of said band segment between the support and the band segment.

FIG. 4 is a side view of the band segment of FIG. 2 wherein the room temperature vulcanizable silicone rubber has also been applied to the upper surface of the end of said band segment of FIG. 2.

FIG. 5 is a side view of a pair of the band segments of FIG. 2 disposed in an overlapping relationship having room temperature vulcanizable silicone rubber present on both their upper and lower surfaces with each band segment extending in an opposite direction.

FIG. 6 is a side view of the overlapping band segments of FIG. 5 clamped between two supports capable of applying heat.

FIG. 7 is a perspective view of FIG. 3.

FIG. 8 is a perspective view of FIG. 5 wherein a portion of the release paper 14 is cut away.

FIG. 9 is a cross-sectional view along line 9—9 of FIG. 8.

DESCRIPTION OF PREFERRED EMBODIMENTS

The band segments of multifilament acrylic fibrous material may be either an acrylonitrile homopolymer or an acrylonitrile copolymer which contains at least about 85 mole percent of acrylonitrile units and up to about 15 mole percent of one or more monovinyl units copolymerized therewith. Representative monovinyl units which may be incorporated in the acrylonitrile copolymers include styrene, methyl acrylate, methyl methacrylate, vinyl acetate, vinyl chloride, vinylidene chloride, vinyl pyridine, and the like.

The band segments of acrylic multifilament fibrous material may be formed in accordance with conventional solution spinning techniques (e.g., they may be formed by wet spinning or dry spinning). Preferably the acrylic fibrous material is hot drawn in accordance with known techniques to improve its physical properties, e.g., tenacity.

The size of the substantially flat multifilament band segments of acrylic fibrous material may be varied. For instance, the band segments may have a width of about 1 to 36 inches or more, and a relatively thin thickness of about 0.003 to 0.12 inch so that heat generated during the thermal stabilization reaction readily may be dissipated. The length of the band segments preferably is as long as possible and commonly corresponds to the lengths commercially available. For instance, acrylic bands can be purchased in bale form having lengths of up to about 10,000 feet, or more. The filaments forming the same may be crimped or uncrimped. The filaments of the band segments commonly possess an average denier per filament of about 1.5 to 3.5, of more. In a preferred embodiment of the invention the band segments utilized are flattened acrylic tows. Each band segment may consist of about 40,000 to 160,000, or more, continuous filaments. If desired, a plurality of parallel bands arranged in an edge-to-edge relationship may be joined to another band segment of plurality of band segments having the same overall width employing the splice of the present invention.

Stabilization promoting catalysts optionally may be incorporated within the acrylic fibers.

Generally, all of the silicone rubbers suitable for use as an adhesive in the preparation of the splice herein described in the present invention are based on low molecular weight polymers with reactive end groups which are subsequently crosslinked to obtain polymers having a molecular weight of about 300,000 to 1,000,000. Such polymers prior to crosslinking may be illustrated by the recurring structural formula

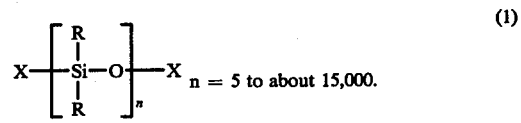

wherein X is typically hydrogen and R and R' may include various organic radicals well known to those skilled in the art.

Such silicone rubbers are thermally stable at temperatures of about 250° C for long periods while certain grades are capable of operating for short periods at up to 300° C. Such rubbers possess sufficient elasticity to enable the splice to which they are applied to withstand the stresses applied during the thermal stabilization reaction.

It is important to note that the present invention lies in the discovery that silicone rubbers may be used to provide a splice which effectively dissipates the heat of reaction of the process as herein described.

The "backbone" of the silicone rubber polymer comprises linked silicon and oxygen atoms similar to the structure of inorganic materials such as glass, sand, or mica, but having organic side-groups which modify its characteristics. Further characteristics of the silicone rubbers as is well known in the art, can also be altered by varying the curing agent, the type of filler, and by the addition of special additives. In the case of heat-cured stocks, the development of optimum properties also depends on the processing conditions.

The silicone rubbers suitable for use in the present invention may be divided according to the process conditions to which they are subjected to effect cure.

One class of silicone rubbers are cured by the application of heat and may be supplied fully compounded, or as a base which can be further compounded. The curing of such rubbers is generally achieved with organic peroxides which are reactive at the elevated temperatures employed.

Another and preferred class of silicone rubbers does not require heating during cure and is referred to as room-temperature vulcanizing (hereinafter RTV). The polymers of this class, as is well known to those skilled in the art are available in two package (component) systems and in one package (component) systems.

The two component system generally comprises an organopolysiloxane containing reactive terminal groups, a crosslinking agent and a condensation catalyst. In these systems the reactive polymer end group is usually silanol ($\equiv$S—OH). The curing agent (cross linker) must have a functionality greater than of equal to 3. Such curing agent may for example be a silanol containing silicone, in which case an organic base may be used as a condensation catalyst as illustrated by the following reaction

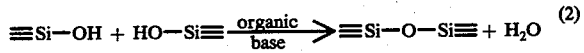

$$\equiv Si-OH + HO-Si\equiv \xrightarrow{\text{organic}}{\text{base}} \equiv Si-O-Si\equiv + H_2O \quad (2)$$

For a more detailed description see U.S. Pat. No. 3,205,283 which is herein incorporated by reference.

An alkoxy containing crosslinker (e.g., ethyl O - silicate) generally requires a catalyst such as Sn soap. (See U.S. Pat. Nos. 2,843,555 and 3,127,363 which are herein incorporated by reference).

If a polyfunctional aminoxy silicon compound is used as a curing agent a catalyst is not always required. (See U.S. Pat. Nos. 3,341,486; 3,441,583; and 3,484,471 which are herein incorporated by reference).

Such reactions may be summarized by the following equations:

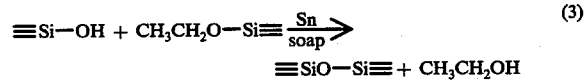

$$\equiv Si-OH + CH_3CH_2O-Si\equiv \xrightarrow{\text{Sn}}{\text{soap}}$$
$$\equiv SiO-Si\equiv + CH_3CH_2OH \quad (3)$$

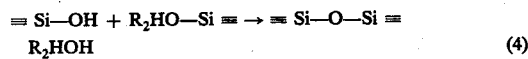

$$\equiv Si-OH + R_2HO-Si \equiv \rightarrow \equiv Si-O-Si \equiv$$
$$R_2HOH \quad (4)$$

The one component room temperature vulcanized silicone rubbers suitable for use in the present invention are generally prepared by adding a polyfunctional silicone-containing curing agent such as triacetoxy silane to a silanol chain stopped polydiorganosiloxane. Others are made by compounding a polymer that is end stopped with the curing agent. A condensation catalyst is generally added to either type. In an absolutely dry system the curing agent has no crosslinking action. However, the presence of moisture (e.g., from the atmosphere) hydrolyses the curing agent and allows it to crosslink with silicone rubber containing hydroxyl groups. Such crosslinking reactions may be represented by the following equations:

$$\equiv Si-OH + R-O\equiv Si \equiv \rightarrow \equiv Si-O-Si \equiv + ROH \quad (5)$$

and

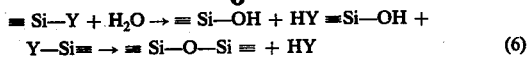

$$\equiv Si-Y + H_2O \rightarrow \equiv Si-OH + HY \equiv Si-OH + Y-Si\equiv \rightarrow \equiv Si-O-Si \equiv + HY \quad (6)$$

wherein Y is a reactive group on the curing agent that terminates the polymer chain.

The curing agent which may be used, typically contain reactive functional groups such as acyloxy, alkoxy, amino, ketoximo, aldoximo, and amido. For a more detailed description see British Pat. No. 835,790; Belg. Pat. Nos. 569,320; 577,012; 614,394 and 637,096; U.S. Pat. Nos. 3,035,016; 3,133,891; 3,334,067; 3,294,739; 3,032,528; 3,291,772 and 3,184,427 and Fr. Pat. No. 1,432,799 which are herein incorporated by reference.

A third class of silicone rubber which may be utilized in the present invention may be designed as either a one component or two component system. Such systems utilize a metal ion-catalyzed addition of a polyfunctional silicone hydride crosslinker to a dimethyl-vinylsiloxy terminated silicone polymer. Cure takes place even in the absence of atmospheric moisture. For a more detailed description see U.S. Pat. Nos. 2,823,218; 3,020,260; 3,159,601; 3,220,972; 3,524,967 and 3,436,366 which are herein incorporated by reference.

For a more detailed description of silicone rubbers see C. Blow, *Rubber Technology and Manufacture* (1972); M. Morton, *Rubber Technology* (1973) and W. Hoffman, *Vulcanization and Vulcanizing Agents*, (1968) which are herein incorporated by reference.

The preferred compositions of the present invention comprise the one component room temperature vulcanized silicone rubber polymers. Such polymers, as described above, may be obtained by reacting (A) a silanol chain-stopped polydiorganosiloxane with (B) a polyfunctional silicone containing crosslinking agent.

The silanol chain-stopped polydiorganosiloxane of component A may be represented by the formula

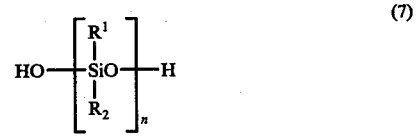

$$HO \text{---}\left[\begin{array}{c} R^1 \\ | \\ SiO \\ | \\ R_2 \end{array}\right]_n\text{---}H \quad (7)$$

wherein $R^1$ and $R^2$ are each organic radicals of not more than eight carbon atoms selected from the group consisting of hydrocarbyl, halohydrocarbyl, and cyano lower alkyl and $n$ is an integer not less than 5 (e.g., from about 5 to about 15,000). The term "hydrocarbyl" as used here means the hydrocarbon from which one hydrogen has been removed, i.e., a monovalent hydrocarbon radical.

The silanol chain-stopped polydiorganosiloxanes are well known in the art and include compositions containing different $R^1$ and $R^2$ groups. For example, the $R^1$ groups can be methyl while the $R^2$ groups can be phenyl and/or beta-cyanoethyl. Furthermore, within the scope of the definition of polydiorganoxiloxanes useful in this invention are copolymers of various types of diorganosiloxane units such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably, at least 50 percent of the $R^1$ and $R^2$ groups of the silanol chain-stopped polydiorganosiloxanes are methyl groups.

A mixture of various silanol chain-stopped polydiorganosiloxanes also may be employed. The silanol chain-stopped materials useful in the RTV compositions have been described as polydiorganosiloxanes but such materials can also contain minor amounts, e.g., up to about 20 percent of monoorganosiloxane unit such as monoalkylsiloxane units, e.g., technology involved in incorporating monoalkylsiloxane units into RTV compositions is disclosed in U.S. Pat. No. 3,382,205 of Beers (1968), which is herein incorporated by reference. The silanol chain-stopped materials may also contain triorganoxiloxane units, such as trialkylsiloxane units, e.g., trimethylsiloxane units, tributylsiloxane units and triphenylsiloxane units. The silanol chain-stopped materials may also contain t-alkoxysiloxane units, e.g., t-butoxysiloxane units, t-pentoxysiloxane units and t-amyloxysiloxane units.

The liquid silanol chain-stopped polydiorganosiloxanes can vary from thin fluids up to viscous gums, depending upon the value of $n$ in Formula 7 and the nature of the particular organic group represented by $R^1 R^2$. Preferably, however, the silanol chain-stopped polydiorganosiloxane is selected to have a viscosity in the range of about 100 centipoise to 50,000 centipoise when measured at 25° C.

Conventionally, the crosslinking component will be an organosilicone compound or mixtures thereof containing one or more functional groups. They will be either organosilicone compounds of the general formula:

$$R_m SiX_{4-m} \qquad (8)$$

in which R is a member selected from the group consisting of hydrocarbyl, halogenated hydrocarbyl and cyano lower alkyl, X is a reactive group capable of condensation with a silanol group of component (A), such as a hydroxyl, alkoxy, aryloxy, acryloxy, amino, ketoximo, aldoximo and amido group, and $m$ may vary from 1 to 3, or they will be the corresponding siloxanes. This definition includes the following groups of compounds:

a. silanes of the formula $R_m SiX_{4-m}$;
b. corresponding di-, tri-, tetra- or polysiloxanes;
c. organopolysiloxane resins having a functionality greater than 1, and advantageously greater than 2.5.

It is noted that any of the organic radicals common to organosilicone chemistry can be found on such organosilicone compounds. For example, radicals within the scope of R of formula 8 include alkyl radicals, e.g., methyl, ethyl, propyl, butyl, octyl, etc.; aryl radicals e.g., phenyl, naphthyl, tolyl, etc.; aralkyl radicals, e.g., benzyl, phenylethyl, etc.; alkenyl radicals, e.g., vinyl, allyl, etc., cycloaliphatic hydrocarbon radicals, e.g., cyclohexyl, cycloheptyl, cyclohexenyl, etc.; various halogenated monovalent hydrocarbon radicals, such as, for example, chloromethyl, alpha-chloroethyl, beta-chloroethyl, chlorophenyl, dibromophenyl, trifluoromethylphenyl trifluoromethylpropyl, etc.; as well as cyanoalkyl radicals, such, for example, as cyanomethyl, beta-cyanoethyl, beta-cyanopropyl, gamma-cyanopropyl, omega-cyanobutyl, etc.

Preferable radicals represented by R in formula 8 are phenyl or lower alkyl with the preferred specific radical being methyl.

When the silane is employed as a crosslinking agent, $m$ has a value of 1 and the preferred silane is $CH_3Si(OCH_3)_3$. When it is desired to have a chain extending agent employed in combination with the crosslinking agent, $m$ has a value of 2 resulting in the silane being difunctional. The preferred difunctional silane is $(CH_3)_2Si(OCH_3)_2$. The presence of a chain extending agent results in a final cured product having a higher degree of elasticity. The same result would be obtained if a higher molecular weight silanol-stopped fluid were used, however, the use of such a higher molecular weight silanol-stopped fluid would result in a much higher viscosity of the curable composition resulting in difficulties in handling the extremely viscous material.

When it is desired to improve the modulus of elasticity, a silane of formula 8, wherein $m$ has a value of 3, is incorporated into the RTV composition. The preferred silane for this application is $(CH_3)_3SiOCH_3$. The use of this monofunctional silane chain terminating unit in combination with the crosslinking and optionally chain extending silanes discussed above, not only results in a higher modulus of elasticity but in many instances also improves the adhesion of the cured compositions to a substrate.

A further preferred R.T.V. silicone rubber is Silastic ® R.T.V. adhesive manufactured by Dow Corning Corp., Midland, Michigan.

The room temperature curing silicone rubber compositions which may be utilized in the present invention are prepared by simply mixing one or more organosilicone compounds of formula 8 with the silanol chain-stopped polydiorganosiloxane liquid of formula 7. Since the organosilicone compounds of formula 8 will tend to hydrolyze upon contact with moisture, care should be exercised to exclude moisture during the addition of organosilicone compound to the liquid silanol chain-stopped polydiorganosiloxane. Likewise, care should be taken that the organosilicone compound of formula 8 and the liquid silanol chain-stopped polydiorganosiloxane of formula 7 is maintained under substantially anhydrous conditions if it is desired to store the mixture for an extended period of time in the liquid state prior to use in the described process.

The amounts of the organosilicone compound added to the liquid silanol necessary to achieve the desired properties is well within the skill of the art.

Compositions prepared by mixing the organosilicone compound of formula 8 with the liquid silanol chain-stopped polydiorganosiloxanes can be used without further modification by merely placing the compositions on the splice and permitting them to cure upon exposure to the moisture present in the atmosphere.

However, it is often desirable to modify the compositions of the present invention by the addition of various materials which act as extenders or which change various properties, such as cure rate, color or cost. For example, if it is desired to reduce the time required for complete cure by a factor of from about 2 to 5 without affecting the work life of the room temperature vulcanizing composition, the composition can be modified by the incorporation of a minor amount of carboxylic acid salt, alkoxide and/or chelate of a metal ranging from lead to manganese, inclusive, in the electromotive series of metals. The particular metals included within this scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate and tin ocotoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrates, dibutyl tin diacetate, dibutyl tin dilaurate, divinyl tin diacetate, dibutyl tin dibenzoate, dibutyl tin diocoate, dibutyl tin maleate, dibutyl tin adipate, diisoamyl tin bistrichlorobenzoate, diphenyl lead diformate, dibutyl tin dilactate, dicyclopentyl lead bismonochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, trisphenyl lead cyclohexenyl acetate, and tri-phenyl lead ethylmalonate.

The amount of the metal salt of the organic carboxylic acid which can be employed in the practice of the present invention is a function of the increased rate of curing desired so that any amount of such salt up to the maximum effective amount for increasing the cure rate can be employed. In general, no particular benefit is derived from employing more than about 5% by weight of such metal salt based on the weight of the silanol chain-stopped polydiorganosiloxane fluid. Preferably, where such metal salt is employed, it is present in an amount equal to form about 0.01% to 2.0% by weight, based on the weight of the polydiorganoxiloxane fluid.

Metal chelates such as those disclosed in U.S. Pat. Nos. 3,334,067 and 3,065,194 can also be used in the RTV compositions described herein as catalysts in amounts from about 0.01 part to about 10 parts based on 100 parts of the silanol chain-stopped polydiorganosiloxane.

The alkoxides which can be used in the practice of the present invention include di-butyl tin dimethoxide, dimethyl tin diethoxide, di-butyl tin dibutoxide, tin tetraisopropoxide, tin tetramethoxide, and tri-butyl tin methoxide.

In the practice of the present invention although not required it is preferred to apply heat to the RTV silicone polymers to lessen the time necessary to achieve vulcanization of the surface of the silicone rubber. The heat is optionally applied for a time sufficient for the silicone rubber to develop a thin outer skin as determined by visual observation which is indicative of surface vulcanization.

The compositions which may be utilized in the present invention can also be varied by the incorporation of various extenders or fillers which are stable at temperatures employed in the thermal stabilization zone described above. Illustrative of the many fillers which can be employed with the compositions of the present invention are titanium dioxide, zinc oxide, zirconium silicate, silica arogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, and synthetic fillers. When fillers are added to the composition of the present invention, they are generally employed in amounts of from about 20 to 200 parts filler per 100 parts of the liquid silanol chain-stopped polydiorganosiloxane of formula 7.

In addition to the modification of the compositions of the present invention by the addition of metal salt cure accelerators and fillers, these compositions can also be modified by the incorporation of various flame retardants, stabilizing agents and plasticizers such as siloxane fluids. Suitable flame retardants include antimony oxide, various polychlorinated hydrocarbons and organic sulfonates.

With reference to FIG. 1 the ends of two discrete substantially flat multifilament band segments 1 and 1' of an acrylic fibrous material of the same width are illustrated. Each band segment has a width of about 6 inches, a thickness of about 0.02 inch, and consists of about 160,000 continuous filaments having a denier per filament of about 3.0. For instance, one end may be the tail of a bale of acrylic fiber tow which is being fed to and passed through a thermal stabilization zone, and the other end may be derived from a like bale of the acrylic fiber tow which is awaiting stabilization. If the ends of the bands are not effectively spliced together it will be necessary to shut down the thermal stabilization zone, and introduce the second band segment. Such a procedure would be time consuming and economically unattractive.

With reference to FIG. 2 the end of a band segment 1 is placed upon a support 2 the surface of which is preferably coated with a substance, such as TEFLON TM, to provide a quick release of the room temperature vulcanizable silicone rubber from the support after formation of the splice.

Alternatively a TEFLON TM release paper 5 may be utilized to provide a quick release. The size of said support is tailored to approximate the dimensions of the surface of the end of the band segment to be covered with said silicone rubber. It is preferable to utilize a support which is capable of supplying heat to the overlapped ends during the heating step to cure those silicone rubbers which require a heat initiated cure or to optionally hasten the surface vulcanization of room temperature vulcanizable silicone rubbers.

With reference to FIG. 3, a layer of room temperature vulcanizable silicone rubber adhesive compound 4 which is representative of the preferred class of silicone rubbers is prepared by mixing and reacting 100 parts of a base mixture comprising 100 parts of 10,000 centipoise hydroxy end blocked dimethylpolysiloxane fluid, 15 parts of trimethylsiloxy terminated polydimethylsiloxane fluid and 20 parts of octamethylcyclotetrasiloxane fumed silica with 4 parts of methyltrimethoxy silane, and 1.02 parts acetonitrile in any suitable manner such as disclosed in U.S. Pat. No. 3,689,454 and applied to the lower surface of band 1 by depositing it between band 1 and the support or alternatively between band 1 and the release paper. The covered yarn is preferably then rolled to ensure band wetting wherein the spaces between the fibers are filled by the rubber paste. The rolling step may be omitted where other means of achieving band wetting are utilized.

With reference to FIG. 4, a second layer of the same rubber adhesive 6 is applied to the upper surface of band 1 and re-rolled.

With reference to FIG. 5 a second band segment 1' is stretched over the prepared area in a manner similar to that utilized for band 1 and also clamped between clamps 3 and 3'. A ⅛ inch thick layer 8 of the silicone rubber adhesive is subsequently applied to the upper surface of band segment 2 over the area of intended splice. A release paper 14 (e.g., TEFLON ™) is preferably applied over the covered surface and re-rolled to ensure band wetting.

To ensure a satisfactory splice it is preferred to provide a minimum area of overlap to achieve an adequate splice without hampering process flow. Thus, although any effective area of overlap may be utilized it is preferred that such area constitute from about 3 times to about 12 times, preferably from about 4 times to about 9 times and most preferably about 4 times to about 6 times the width of the band segments.

To ensure adequate bonding it is generally preferred to apply the silicone rubber to an area substantially coextensive with the area of overlap or intended overlap in amounts sufficient to cover the same.

With reference to FIG. 6 a platen 10, which also is preferably capable of supplying heat to the splice during the heating step is applied to the uppermost layer of rubber paste and compressed downward with any suitable means such as a pair of "C" clamps (11 and 11') which may be applied at points 12 and 12'.

The clampable support it utilized to shape the splice into a thin flat joint, which allows for smooth running of the band through the heated thermal stabilization zone. The clamped support is allowed to remain in position until the silicone adhesive develops an outer skin as a result of surface vulcanization and then removed (i.e., when the silicone adhesive is room temperature vulcanizing) or in the case of heat cured silicone rubbers the heated clamped support is allowed to remain in place for as long as it is necessary to apply heat to effect cure. The pressure utilized to achieve band wetting and shaping of the joint under which the splice is preferably compressed may vary from about 5 to about 10 psig. When a room temperature vulcanizable silicone rubber is utilized and the clamps are secure the splice may be heated to temperatures which may vary from about 50° to about 100° C, preferably from about 75° to about 100° C in order to hasten surface vulcanization. Temperatures well known in the art may be applied to effect cure of those silicone rubbers which do not vulcanize at room temperature. Such heat is preferably supplied by heating the support 2 and platen 10 through heating means 13 and 13'.

The resulting cured splice is tough, strong and flexible. It retains a significant amount of its strength after heating and flexing at temperatures to 275° C. In addition, the R.T.V. splice serves to keep the fibers spread and acts as a heat sink to dissipate the exothermic heat generated during the heating of the acrylic. The splice can therefore withstand normal processing conditions and a decrease in processing temperatures at the occurrence of a splice to insure stable mechanical processing is no longer necessary.

The resulting splice is flat in configuration and enables the band segment including the splice to be continuously passed through a heated thermal stabilization zone without hang-up or impairment of movement resulting from the presence of a splice. The usual exothermic heat of reaction which is evolved during the cyclization portion of the thermal stabilization reaction effectively is dissipated from within the splice without harm.

The thermal stabilization of the resulting band may be carried out in accordance with techniques known in the art. The substantially flat multifilament band may be continuously passed through the thermal stabilization zone in the direction of its length wherein it is rendered black in appearance and non-burning when subjected to an ordinary match flame. For instance, the movement of the band through the thermal stabilization zone may be made possible by passing the same over a multiplicity of rotating parallel rolls while the band is in a festooned relationship to each roll. The band may be looped about each parallel roll in a single wrap and is then passed to the next roll where it is looped in an identical manner. Since the rotating rolls have a cylindrical configuration and are in a parallel relationship the controlled passage of the band undergoing stabilization is effectively maintained.

The number and length of any parallel rolls may be varied. The greater the number and separation of the rolls, the greater the residence time attainable at a given band speed. The greater the length of the parallel rolls, the greater the width of the band which may be stabilized. The rolls may engage a conventional drive mechanism wherein the rolls are caused to rotate in unison according to known techniques. If desired, the rolls may optionally idle, i.e., be rotated by the movement of the band looped thereon.

The band is contacted with a heated gaseous atmosphere present within the thermal stabilization zone until it attains a thermally stabilized form while retaining its original fibrous configuration essentially intact. The optimum treatment times and temperatures will vary depending upon the composition, denier per filament, and size of the multifilament band of acrylic fibrous material. Stabilization temperatures are selected which may be withstood by the band without destruction of its original fibrous configuration. The higher the temperature of the heated gaseous atmosphere generally the greater the rate at which the stabilization reaction occurs.

The gaseous atmosphere provided in the thermal stabilization zone preferably is oxygen-containing, and conveniently may be heated air. When the multifilament band is formed of conventional acrylonitrile homopolymer filaments of about 1.7 denier per filament, and the thermal stabilization zone is provided with a circulating air atmosphere at a temperature of about 260° C, the band commonly is thermally stabilized within about 60 to 180 minutes. When the multifilament band is formed of an acrylonitrile copolymer (i.e., Orlon acrylic tow) having a denier per filament of about 1.5, and the thermal stabilization zone is provided with circulating air at a temperature of about 250° C, the band commonly is thermally stabilized within about 60 to 240 minutes. Alternatively, the band of acrylic fibrous material may be thermally stabilized by heating in a stabilization zone which is provided at successively elevated temperatures as described in commonly assigned U.S. Pat. No. 3,539,295 of Michael J. Ram which is herein incorporated by reference.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. In a process for the thermal stabilization of a substantially flat multifilament band of an acrylic fibrous material wherein the ends of at least two discrete band segments each having an upper and lower surface are joined and continuously are passed in a successive manner in the direction of their length through a heated thermal stabilization zone, thereby inducing an exothermic cyclization reaction of pendant nitrile groups present thereon and wherein the original fibrous configuration of the same is maintained substantially intact for a residence time sufficient to render said band black in appearance, and non-burning when subjected to an ordinary match flame; the improvement comprising joining the ends of at least two of said band segments by bonding the substantially flat surfaces of said band segments together with a silicone rubber adhesive in a manner sufficient to provide a flexible splice, through which the exothermic heat of reaction is dissipated to an extent sufficient to avoid a deleterious effect on the original fibrous configuration which might otherwise result in the absence of such dissipation, wherein the ends of said band segments are disposed in an overlapped relationship with each of said band segments extending in an opposite direction with the silicone rubber being present on the upper and lower surfaces of said overlapping ends.

2. An improved process according to claim 1 wherein said multifilament band of an acrylic fibrous material is selected from the group consisting essentially of an acrylonitrile homopolymer and acrylonitrile copolymer which contain at least about 85 mole percent of acrylonitrile units and up to about 15 mole percent of one or more monovinyl units copolymerized therewith.

3. An improved process according to claim 1 wherein said multifilament band has a width of about 1 to 36 inches.

4. An improved process according to claim 1 wherein pressure is applied to the overlapping band segments of from about 5 to about 10 psig during cure of the silicone rubber adhesive.

5. An improved process according to claim 1 wherein the extent of the overlap of the terminal portions of the band segments having the silicone rubber present thereon is from about 3 to about 12 times the width of a band segment.

6. In a process for the thermal stabilization of a substantially flat multifilament band of an acrylic fibrous material wherein the ends of at least two discrete band segments each having an upper and lower surface are joined and continuously are passed in a successive manner in the direction of their length through a heated thermal stabilization zone, thereby inducing an exothermic cyclization reaction of pendant nitrile groups present thereon and wherein the original fibrous configuration of the same is maintained substantially intact for a residence time sufficient to render said band black in appearance, and non-burning when subjected to an ordinary match flame; the improvement comprising joining the ends of at least two of said band segments by bonding the substantially flat surfaces of said band segments together with a room temperature vulcanizable silicone rubber in a manner sufficient to provide a flexible splice, through which said exothermic heat of reaction is dissipated to an extent sufficient to avoid a deleterious effect on the original fibrous configuration which might otherwise result in the absence of such dissipation, wherein the ends of said band segments are disposed in an overlapped relationship with each of said band segments extending in an opposite direction and with the room temperature vulcanizable silicone rubber being present on the upper and lower surfaces of said overlapping ends.

7. An improved process according to claim 6 wherein said multifilament band of acrylic fibrous material is selected from the group consisting essentially of an acrylonitrile homopolymer and acrylonitrile copolymer which contain at least 85 mole percent of acrylonitrile units and up to about 15 mole percent of one or more monovinyl units copolymerized therewith.

8. An improved process according to claim 6 wherein said multifilament band of an acrylic fibrous material is a flattened tow.

9. An improved process according to cliam 6 wherein said multifilament band has a width of about 1 to 36 inches.

10. An improved process according to claim 6 wherein heat is applied to the overlapping band segments at temperatures of from about 50° to about 100° C for a period sufficient to achieve vulcanization of the surface of the room temperature vulcanizable silicone rubber.

11. An improved process according to claim 6 wherein pressure is applied to the overlapping band segments of from about 5 to about 10 psig during cure of the silicone rubber.

12. An improved process according to claim 6 wherein the extent of the overlap of the end portions of the band segments having the room temperature vulcanizable silicone rubber present thereon is from about 4 to about 9 times the width of a band segment.

13. The improved process of claim 6 wherein the room temperature vulcanizable silicone rubber is the reaction product of (A) a silanol chain-stopped polydiorganosiloxane of the recurring structural formula

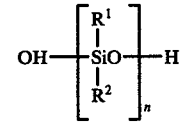

wherein $R^1$ and $R^2$ may be the same or different and represent organic radicals of not more than eight carbon atoms selected from the group consisting of hydrocarbyl, halohydrocarbyl, and cyano lower alkyl and $n$ is an integer greater than 5, and (B) a polyfunctional organosilicone compound of the general formula

wherein R is a member selected from the group consisting of hydrocarbyl, halohydrocarbyl and cyano lower alkyl raidcals, X is a reactive group capable of condensation with a silanol group of component A selected from the group consisting of hydroxyl, alkoxy, aryloxy, acyloxy, amino, ketoximo, aldoximo and amido, and $m$ may vary from 1 to 3.

14. In a process for the thermal stabilization of a substantially flat multifilament band of an acrylic fibrous material wherein the ends of at least two discrete band segments each having an upper and lower surface are joined and continuously are passed in a successive manner in the direction of their length through a heated thermal stabilization zone, thereby inducing an exothermic cyclization reaction of pendant nitrile groups present thereon and wherein the original fibrous configuration of the same is maintained substantially intact for a residence time sufficient to render said band black in appearance, and non-burning when subjected to an ordinary match flame; the improvement comprising joining the ends of at least two of said band segments by
(a) providing a room temperature vulcanizable silicone rubber on the lower surface of the end of one of said substantially flat band segments,
(b) providing a room temperature vulcanizable silicone rubber on the upper surface of the end of the previously treated band segment of step (a) in a manner sufficient to deposit said silicone rubber over an area, which is substantially coextensive with, and corresponds substantially to, the area covered by the silicone rubber present on said lower surface,
(c) overlapping the end of a second substantially flat band segment with the previously treated end of the band segment of step (b) with each of said band segments extending in an opposite direction,
(d) applying said room temperature vulcanizable silicone rubber to the upper surface of the end of said second band segment in a manner sufficient to deposit said silicone rubber over an area which is substantially coextensive with and corresponds to the area provided by the silicone rubber as provided in step (a),
(e) subjecting said overlapping end portions of each band segment to pressure whereby the overlapping end of each band segment is wet and bonded together by said room temperature vulcanizable silicone rubber to form a flexible splice through which said exothermic heat of reaction is dissipated to an extent sufficient to avoid a deleterious effect on the original fibrous configuration which might otherwise result in the absence of such dissipation.

15. The process of claim 14 wherein the multifilament band of an acrylic fibrous material is selected from the group consisting of an acrylonitrile homopolymer and acrylonitrile copolymers which contain at least about 85 mole percent of acrylonitrile units and up to about 15 mole percent of one or more monovinyl units copolymerized therewith.

16. The process of claim 14 wherein the multifilament band of an acrylic fibrous material is a flattened tow.

17. The process of claim 14 wherein the multifilament band of an acrylic fibrous material has a width of about 1 to 36 inches.

18. The multifilament band of acrylic fibrous material according to claim 14 wherein the extent of the overlap of the terminal portions of the band segments having the silicone rubber present thereon is from about 4 to about 6 times the width of a band segment.

19. The process of claim 14 wherein the overlapping end portions of each band segment having the silicone rubber present thereon are heated to a temperature of about 75° to 100° C to hasten vulcanization of the surface of the silicone rubber.

20. The process of claim 14 wherein the pressure of bonding is about 5 to about 10 psig.

21. The process of claim 14 wherein the room temperature vulcanizable silicone rubber is a reaction product of
(A) a silanol chain-stopped polydiorganosiloxane of the recurring structural formula

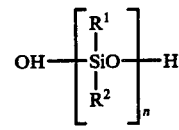

wherein $R^1$ and $R^2$ may be the same or different and represent organic radicals of not more than eight carbon atoms selected from the group consisting of hydrocarbyl, halohydrocarbyl, and cyano lower alkyl and $n$ is an integer greater than 5, and
(B) a polyfunctional organosilicone compound of the general formula $$R_m SiX_{4-m}$$

wherein R is a member selected from the group consisting of hydrocarbyl, halohydrocarbyl and cyano lower alkyl raidcals, X is a reactive group capable of condensation with a silanol group of component A selected from the group consisting of hydroxyl, alkoxy, aryloxy, acyloxy, amino, ketoximo, aldoximo and amido, and $m$ may vary from 1 to 3.

22. In a process for the thermal stabilization of a substantially flat multifilament band of an acrylic fibrous material wherein the ends of at least two discrete band segments each having an upper and lower surface are joined and continuously are passed in a successive manner in the direction of their length through a heated thermal stabilization zone, thereby inducing an exothermic cyclization reaction of pendant nitrile groups present thereon and wherein the original fibrous configuration of the same is maintained substantially intact for a residence time sufficient to render said band black in appearance, and non-burning when subjected to an ordinary match flame; the improvement comprising joining the ends of at least two of said band segments by
(a) placing the end of one of said substantially flat band segments over a flat support,
(b) applying a tension across said end of the band segment in a manner sufficient to suspend said end slightly above the support,
(c) applying a room temperature vulcanizable silicone rubber to the lower surface of the end of said band segment between said surface and said support in a manner sufficient to avoid bonding of said silicone rubber to said support,
(d) applying pressure to the surface of the end of said band segment having the silicone rubber present thereon to insure band wetting,
(e) applying a room temperature vulcanizable silicone rubber to the upper surface of the end of the previously treated band segment in a manner sufficient to deposit said silicone rubber over an area which is substantially coextensive with, and corresponds to the surface covered by the silicone rubber present on said lower surface,
(f) re-applying pressure to the surface of the end of the band segment having the silicone rubber present on its upper and lower surface to insure band wetting,
(g) overlapping the end of a second substantially flat band segment with the previously treated end of the band segment of step (f) with each of said band segments extending in an opposite direction, (h) applying said room temperature vulcanizable silicone rubber to the upper surface of the second band segment in a manner sufficient to deposit said silicone rubber over an area which is substantially coextensive with, and corresponds to, the area covered by the silicone rubber as provided in step (c), (i) subjecting said overlapping ends of each band segment to pressure in a manner sufficient to compress the overlapping ends against said support whereby said overlapping ends are bonded together by said room temperature vulcanizable silicone rubber to form a flexible splice through which the exothermic heat of reaction is dissipated to an extent sufficient to avoid a deleterious effect on the original fibrous configuration which might otherwise result in the absence of such dissipation.

23. The process of claim 22 wherein the room temperature vulcanizable silicone rubber is a reaction product of (A) a silanol chain-stopped polydiorganosiloxane of the recurring structural formula

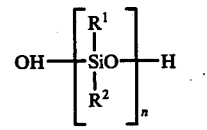

wherein $R^1$ and $R^2$ may be the same or different and represent organic radicals of not more than eight carbon atoms selected from the group consisting of hydrocarbyl, halohydrocarbyl, and cyano lower alkyl and $n$ is an integer greater than 5, and (B) a polyfunctional organosilicone compound of the general formula $$R_m SiX_{4-m}$$

wherein R is a member selected from the group consisting of hydrocarbyl, halohydrocarbyl and cyano lower alkyl radicals, X is a reactive group capable of condensation with a silanol group of component A selected from the group consisting of hydroxyl, alkoxy, aryloxy, acyloxy, amino, ketoximo, aldoximo and amido, and $m$ may vary from 1 to 3.

* * * * *